Feb. 5, 1935. E. J. W. RAGSDALE ET AL 1,990,252
AIRPLANE BRAKE
Filed June 21, 1930 2 Sheets-Sheet 2

INVENTORS.
ROBERT B. TEMPLE
BY EARL J.W. RAGSDALE.
ATTORNEY.

Patented Feb. 5, 1935

1,990,252

UNITED STATES PATENT OFFICE 1,990,252

AIRPLANE BRAKE

Earl J. W. Ragsdale, Norristown, Pa., and Robert B. Temple, Detroit, Mich., assignors to Budd Wheel Company, Philadelphia, Pa., a corporation of Pennsylvania Application June 21, 1930, Serial No. 462,789

7 Claims. (Cl. 188—78)

The object of our invention has been to produce a simple and inexpensive brake of a self-actuating or wrapping type having a smooth and regular wrapping action together with provision for insuring an accurate axial and radial relative positioning of the parts of the band at all times. A further object is the provision of a superior lost motion arrangement for supporting the anchor end of a wrapping brake band.

A reading of the sub-joined specification in the light of the attached drawings will render clear the manner in which we have attained these and other objects of our invention. While we have illustrated our invention in connection with an airplane brake it will be obvious to those skilled in the art that many of the principles thereof are applicable to other types of brake.

Figure 1:
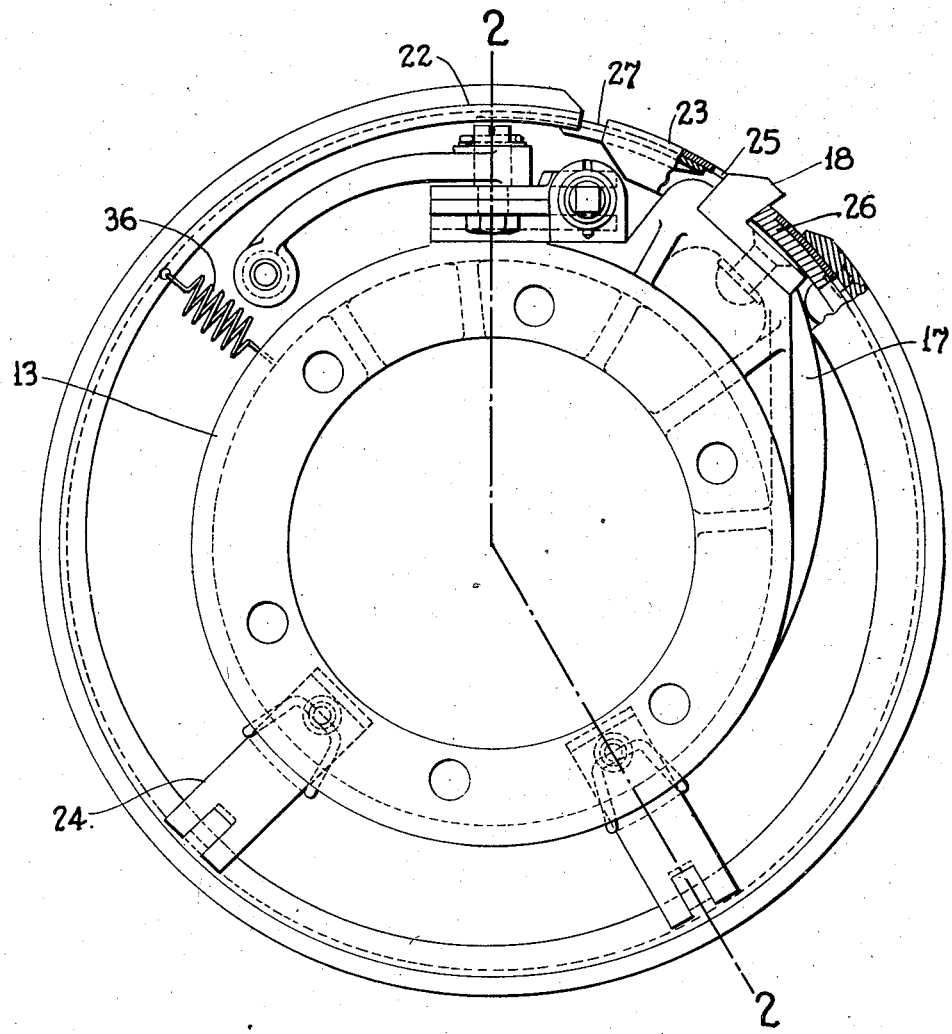
Figure 2:
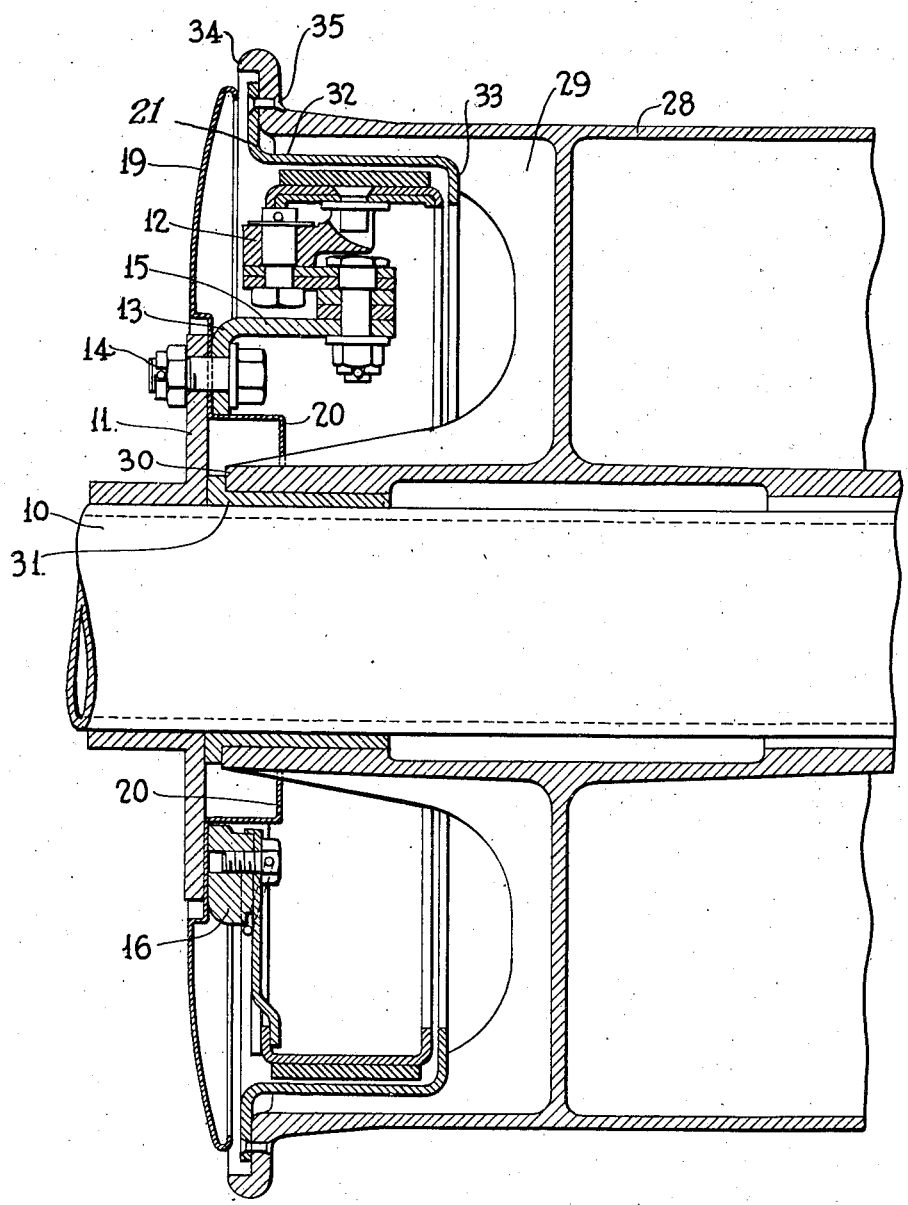

In the drawings, Fig. 1 is a side elevation with parts cut away to illustrate the construction of our improved brake, and Fig. 2 is a cross section of the brake and associated wheel parts on the line 2—2 of Fig. 1.

Referring to the drawings by reference characters, the numeral 10 indicates the axle of the vehicle and 11 a flange which may be either secured to the axle or formed integrally therewith. The brake actuator mechanism 12 may be anchored to this flange by means of an anchor bracket 13 bearing an arm 15 for supporting the actuator mechanism. This actuator mechanism forms no part of our present invention, as any suitable type of actuator mechanism may be used in connection with the features of the invention. The anchor bracket 13 is preferably secured to the flange 11 by means of bolts 14. This bracket is provided at spaced peripheral points with bosses 16 to space guide clips 24 from the flange 11. The function of these guide clips will be later described.

17 denotes an anchor flange which is radially and axially inwardly offset from the main body of the anchor bracket and is provided with a pressure pad 18 at its radial and inner axial extremity. This pressure pad may be formed integrally with the anchor bracket or secured to it in any suitable manner, as by rivets, as illustrated in the drawings. The brake and the interior of the wheel are protected from foreign matter by means of a cover plate 19 which is preferably made of sheet aluminum and secured to the axial flange by the same bolts 14 which secure the anchor bracket in place. This cover plate is provided at its inner periphery with an L-shaped flange 20 which acts as an oil slinger between the bushing 31 about which the wheel rotates and the interior of the braking mechanism. The brake band is preferably formed of pressed metal of channel cross section, the channel flanges being of gradually increasing depth from the actuator end 22 of the band to the anchor end 23. This band is maintained in proper axial alignment with the wheel and drum by means of a series of clips 24 which are bifurcated and have the metal which is cut in the act of bifurcation pressed inwardly to provide a flange spaced from the bifurcated portion to guide one of the channel flanges of the band. Any desired number of these clips may be used, two being shown in the drawings. The band is slotted adjacent its anchor end at 25 and this slot is substantially longer than the circumferential length of the anchor pressure pad 18. A pressure pad 26 is affixed to the band adjacent this slot by any suitable means and is provided with an end portion which forms a reentrant angle with respect to a tangent to the brake drum at this point and extends into the slot and thereby takes the anchor reaction, thus preventing wear upon the brake band itself. The pressure pad 18 is of substantially the same width as the slot 25 and thereby serves to axially guide the band. The purpose of the reentrant angle will be hereinafter set forth.

The slot 25 in the brake band is considerably longer than the pad 18 even after the lug 26 is inserted in this slot. This affords a lost motion connection between the band and pad and thereby facilitates the wrapping of the brake.

A guide strip 27 which may likewise be of channel section is affixed to the anchor end of the brake band beyond the anchor mechanism above described, and has a portion overlapping the channeled operated end of the band. This guide strip is of substantially the same width as the brake band proper and thereby serves to act as a further guide for the band when actuated. The guide strip forms, in effect, a continuation of the anchor end of the band. In this connection it should be noted that the pressure pad 18 operating in the slot 25 and the clips 24 serve as additional means for obtaining an accurate axial alignment of the band at all times.

The wheel proper is designated 28 and consists of an aluminum casting which is webbed as indicated at 29 for strengthening purposes. This wheel is provided with bearing portions 30 which rotate about the bushings 31. The brake drum 32 is provided with an overhanging flange 33 to assist in keeping foreign matter away from the brake band and strengthen it and is further provided with a series of lugs 21 which are riveted to spaced ears 34 on the wheel proper, as indicated at 35. The actuated end of the brake band is normally held down against the end of the guide strip 27 by means of springs 36 as indicated in Fig. 1.

When the actuator mechanism (which forms no part of this invention) is properly adjusted, and the brake band is in its idle position, the pressure pad 18 will abut or substantially abut the left hand end of the slot 25 in the band. Upon the actuation of the brake, the end 22 of the band is expanded against the drum. The rotation of the drum tends to flex the band, thereby causing a wrapping action, whereby the successive sections of the band are gradually brought into contact with the brake drum during the counter-clockwise rotation thereof. Since the pressure pads 18 and 26 afford a slight lost motion connection as described above, there will be no contact between these members at the initiation of the braking action and the wrapping action will therefore progress for a small fraction of a revolution of the drum during the wrapping of the band before any braking effect takes place. This insures a smooth wrapping action. The angularity of the face of the lug 18 causes the end of the band adjacent thereto to lag in its application. This insures a smoother wrapping action of the left hand side of the band, as illustrated in Fig. 1. It also prevents any sudden grab of the ends of the band adjacent to lug 18, as any sudden and violent actuation of the brake band and pressure pad 26 as moved outwardly along the lug 18, will force this pressure pad inwardly rather than outwardly by reason of the reentrant angle of this face of the lug with respect to a tangent to the band at this point.

The band portions will also be accurately aligned during the braking action by reason of the three guiding arrangements above described.

We wish the sub-joined claims to be read according to the spirit of the invention as interpreted in the light of the prior art, and not in a strict and literal sense.

What we claim is:

1. A braking mechanism including in combination, a shoe of continuously increasing flexibility from its actuated end to its anchor end, said shoe being provided with an elongated slot and a pressure pad permanently affixed to a relatively fixed part of the vehicle and extending through said slot.

2. A braking mechanism including in combination, a shoe of continuously increasing flexibility from its actuated end to its anchor end, said shoe being provided with an elongated slot and a pressure pad permanently affixed to a relatively fixed part of the vehicle and extending through said slot, the slot in said shoe being of substantially the same width as said pressure pad.

3. A braking mechanism including, in combination, a flexible shoe of continuously channeled increasing cross section, a pressure pad affixed to a fixed member adjacent the end of the shoe and extending through a slot in the shoe.

4. A braking mechanism including in combination, a shoe of continuously increasing flexibility from its actuated end to its anchor end, said shoe being provided with an elongated slot and a pressure pad permanently affixed to a relatively fixed part of the vehicle and extending through said slot, the slot in said shoe being of substantially the same width as said pressure pad and of greater length than said pad, whereby to provide a lost motion anchor connection for said shoe.

5. A braking mechanism including in combination, a brake shoe provided with an elongated circumferential slot in an axially extending portion thereof through the periphery of said shoe, a pressure pad within said slot, said pressure pad being of less circumferential extent than said slot, whereby to provide a lost motion connection.

6. A braking mechanism including in combination, a brake shoe provided with an elongated circumferential slot in an axially extending portion thereof through the periphery of said shoe, a pressure pad within said slot, said pressure pad being of less circumferential extent than said slot, and substantially co-extensive with said slot axially, whereby to form a circumferential lost motion connection and an axial guide for said shoe.

7. A braking mechanism including in combination, a brake shoe provided with an elongated circumferential slot and a pressure pad extending through said slot and serving to anchor said brake shoe, the anchor face of said pressure pad forming a reentrant angle with respect to a tangent to the shoe at the point of intersection therewith.

EARL J. W. RAGSDALE.
ROBERT B. TEMPLE.